United States Patent
Fukuoka et al.

(10) Patent No.: US 7,249,985 B2
(45) Date of Patent: Jul. 31, 2007

(54) OUTBOARD MOTOR HAVING A COWLING

(75) Inventors: Yoshihito Fukuoka, Shizuoka-ken (JP); Daisuke Nakamura, Shizuoka-ken (JP)

(73) Assignee: Yamaha Marine Kabushiki Kaisha (JP)

( * ) Notice: Subject to any disclaimer, the term of this patent is extended or adjusted under 35 U.S.C. 154(b) by 0 days.

(21) Appl. No.: 11/320,217

(22) Filed: Dec. 28, 2005

(65) Prior Publication Data
US 2006/0160439 A1    Jul. 20, 2006

(30) Foreign Application Priority Data
Dec. 28, 2004   (JP)   ............... 2004-378523

(51) Int. Cl.
*B63H 20/32* (2006.01)
(52) U.S. Cl. ...................... 440/77; 277/641
(58) Field of Classification Search ............. 440/76, 440/77, 78
See application file for complete search history.

(56) References Cited

U.S. PATENT DOCUMENTS

| | | | |
|---|---|---|---|
| 4,930,790 A * | 6/1990 | Sheridan | 440/77 |
| 5,018,998 A | 5/1991 | Kato | |
| 5,025,763 A | 6/1991 | Watanabe | |
| 5,055,074 A * | 10/1991 | Westberg et al. | 440/77 |
| 5,096,208 A * | 3/1992 | Westberg | 440/77 |
| 5,135,239 A * | 8/1992 | Kato et al. | 440/77 |
| 5,487,687 A * | 1/1996 | Idzikowski et al. | 440/77 |
| 6,190,219 B1 | 2/2001 | Meier et al. | |
| 6,699,083 B2 | 3/2004 | Rinzaki et al. | |
| 6,875,066 B2 * | 4/2005 | Wolaver | 440/77 |

FOREIGN PATENT DOCUMENTS

| | | |
|---|---|---|
| JP | 02-292575 | 4/1990 |
| JP | 05-162692 | 6/1993 |
| JP | 2002-240786 | 8/2002 |
| JP | 2002-349257 | 12/2002 |

\* cited by examiner

*Primary Examiner*—Lars A. Olson
(74) *Attorney, Agent, or Firm*—Knobbe, Martens, Olson & Bear, LLP (57) ABSTRACT

A cowling structure for an outboard motor having a top cowl and a bottom cowl for covering an engine, and sealing a mating face between the top cowl and the bottom cowl, including an annular sealing rail forming a sealing face and is attached to the bottom cowl. The annular sealing rail has a tight fitting part and an attaching part on the outer and inner sides of the sealing face, respectively.

15 Claims, 11 Drawing Sheets

OUTBOARD MOTOR HAVING A COWLING

CROSS-REFERENCE TO RELATED APPLICATIONS

This application claims priority to the Japanese Patent Application No. 2004-378523, which was filed on Dec. 28, 2004. The entirety of this application is hereby incorporated by reference.

BACKGROUND OF THE INVENTION

1. Field of the Invention

The present invention relates to an outboard motor having a cowling structure. More specifically, the present invention relates to a sealing arrangement for an outboard motor cowling.

2. Description of the Related Art

Conventionally, an outboard motor has a sealed structure, in which almost all portions of the outboard motor, including the engine, are covered with a cover, since the outboard motor is exposed to the weather, seawater or the like when in use. Problems caused by the entry of water into the outboard motor are thereby minimized or prevented.

The engine of the outboard motor is typically enclosed within a cowling made up of a bottom cowl and a removable top cowl. Mating portions of the top and bottom cowls generally are provided with a sealing member to protect against water intrusion between the mating portions. The top and bottom cowls preferably are coupled with each other by engaging bottom side hooks attached to the opening edge of the bottom cowl and top side hooks attached to the opening edge of the top cowl.

Figure 11:
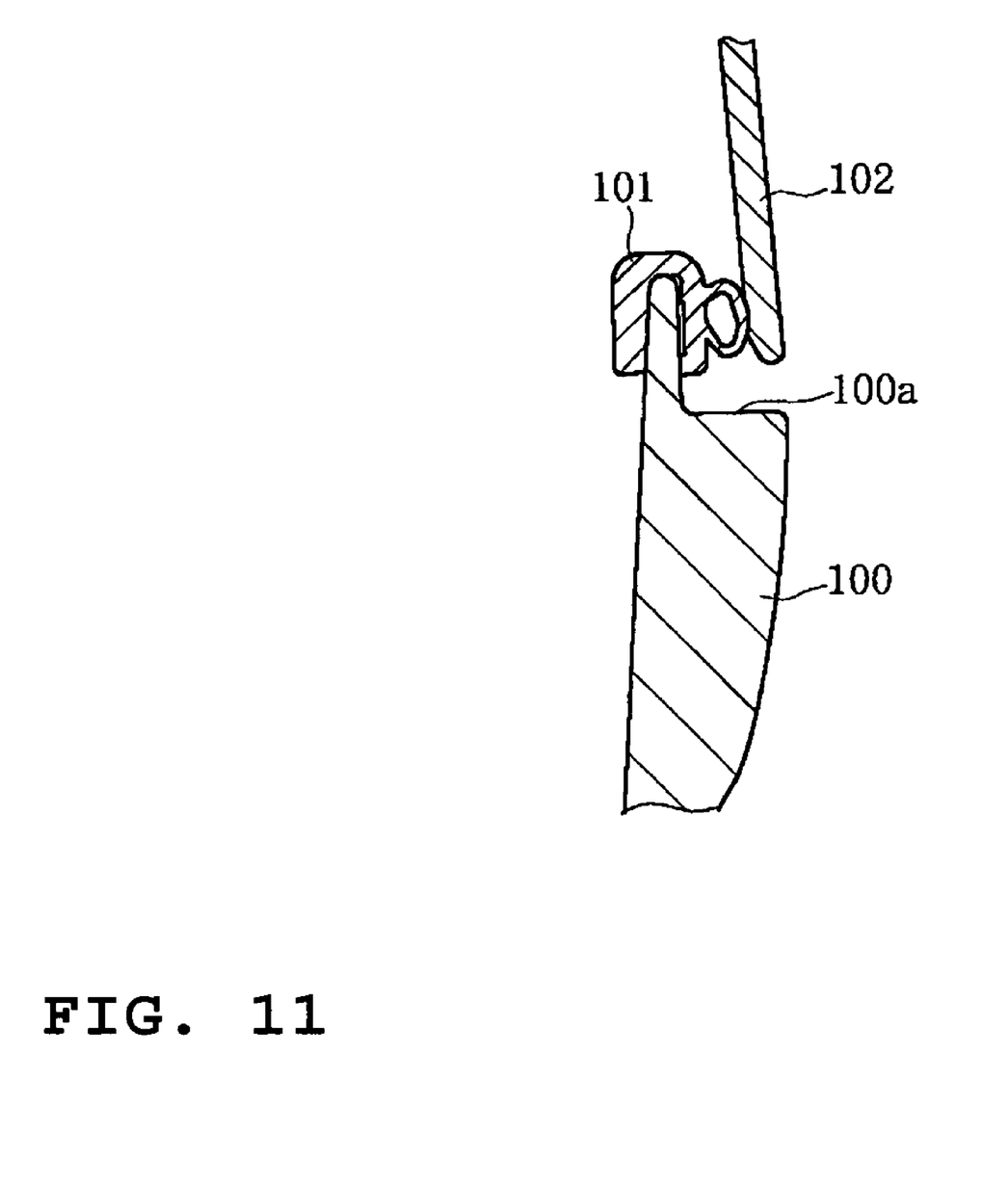
FIG. 11 is a cross-sectional view of an embodiment of a seal formed between conventional top and bottom cowls.

Japanese publication number 05-162692 shows a sealing structure in which a seal member is provided on the lower cowl. The seal is adapted to engage the top cowl. FIG. 11 of the present specification shows another arrangement of a sealing structure between top and bottom cowls. As shown, a rubber seal 101 is provided over a mating face 100a of the bottom cowl 100 to seal the top and bottom cowls 100 and 102.

In the above-discussed sealing structures, the bottom cowl has an increased thickness at or around the sealing portion. This structure undesirably increases the weight of the bottom cowl, and significantly affects the overall weight of the outboard motor.

SUMMARY OF THE INVENTION

A need thus exists for an outboard motor cowling having a sealing structure that enables reduced thickness, and reduced weight, of the mating cowling members while still providing a generally watertight seal.

In accordance with one embodiment, an outboard motor is provided having a cowling enclosing an internal combustion engine. The cowling comprises a top cowl and a bottom cowl configured to be joined to one another so that a bottom portion of the top cowl is coupled to a top portion of the bottom cowl. The bottom cowl has an annular sealing rail adapted to form a sealing face, which is adapted to engage a sealing member to effect a generally watertight seal between the top and bottom cowls. The sealing rail is disposed generally transverse to the upper portion of the bottom cowl.

In another embodiment, an annular sealing member is attached to the annular sealing rail, and the annular sealing member forms a sealing face. In yet a further embodiment, the annular sealing member has a sealing face for sealing with the top cowl and another sealing face for sealing with the bottom cowl.

In accordance with yet another embodiment, an outboard motor is provided having a cowling enclosing an internal combustion engine. The cowling comprises a first cowl member and a second cowl member configured to be joined to one another so that an edge portion of the first cowl is coupled to an edge portion of the second cowl. The first cowl member has an annular seal support that is formed separately from the first cowl. A plurality of support bosses from the first cowl support the annular seal support. The annular seal support comprises a seal support surface adapted to support an annular sealing member. The annular sealing member extends about substantially the circumference of the first cowl and comprising a first sealing face to effect a seal with the first cowl member, and a second sealing face to effect a seal with the second cowl member.

DETAILED DESCRIPTION OF PREFERRED EMBODIMENTS

Figure 1:
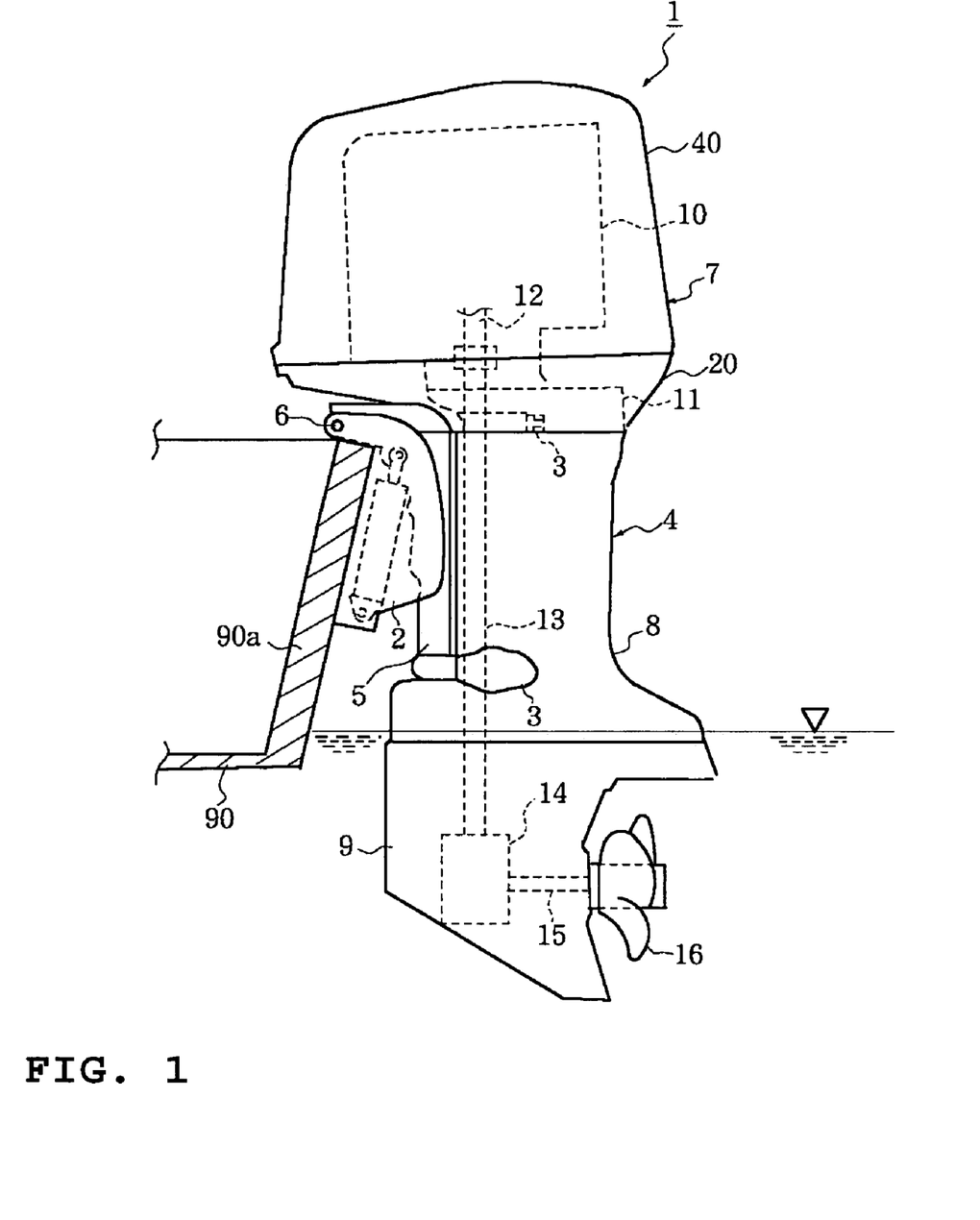
FIG. 1 is a side view of an outboard motor.

With initial reference to FIG. 1, an outboard motor 1 is mounted on a stern plate 90a of a hull 90 by a clamp bracket 2. A swivel bracket 5 having an upper and a lower damper member 3 for elastically supporting a propulsion unit 4 is supported on the clamp bracket 2 for vertical rotation about a horizontal tilt shaft 6.

The propulsion unit 4 has a housing formed by a cowling 7, an upper case 8 and a lower case 9. A four-stroke engine 10 is housed in the cowling 7. The upper case 8 is attached to the bottom of an exhaust guide 11. The engine 10 is supported by the exhaust guide 11. It is to be understood that engines of various combustion principles (four-stroke, two-stroke, diesel and the like) can be employed. Additionally, various combustion chamber arrangements (inline cylinders, V-type cylinder, rotary, and the like) can be employed.

Preferably, a crankshaft 12, disposed vertically in the engine 10, is connected to the upper end of a drive shaft 13 which runs vertically through the inner space of the upper case 8. The lower end of the drive shaft 13 is connected to a forward-reverse shifting mechanism 14 accommodated in the lower case 9. A propeller shaft 15 extends horizontally from the forward-reverse shifting mechanism 14. A propeller 16 is attached to the rear end of the propeller shaft 15, where the propeller shaft 15 extends out of the lower case 9. It is to be understood that other propulsion systems, such as dual, counter-rotating propellers, a jet drive, or the like, can be employed.

Figure 2:
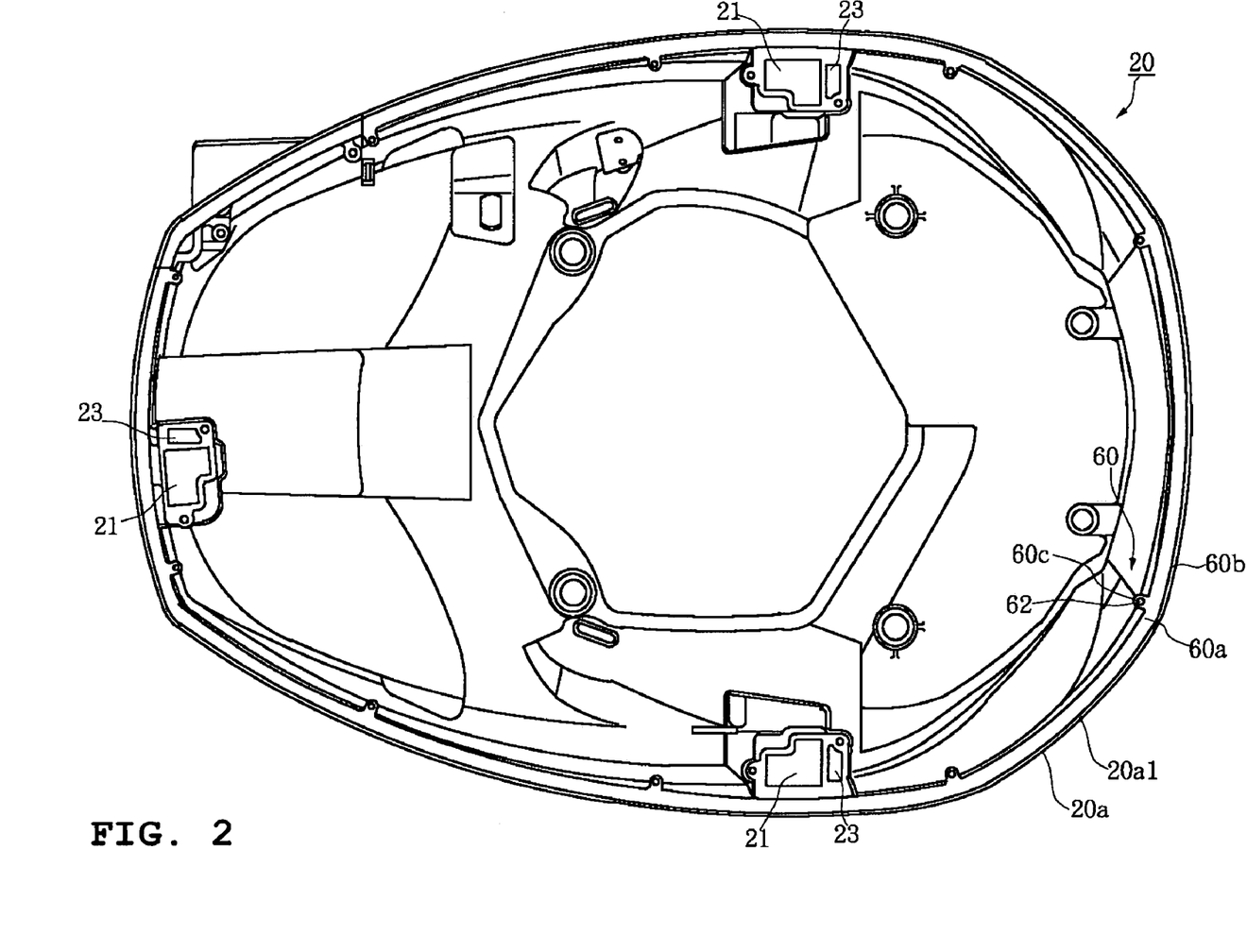
FIG. 2 is a top plan view of a bottom cowl in which an engine is placed.
Figure 3:
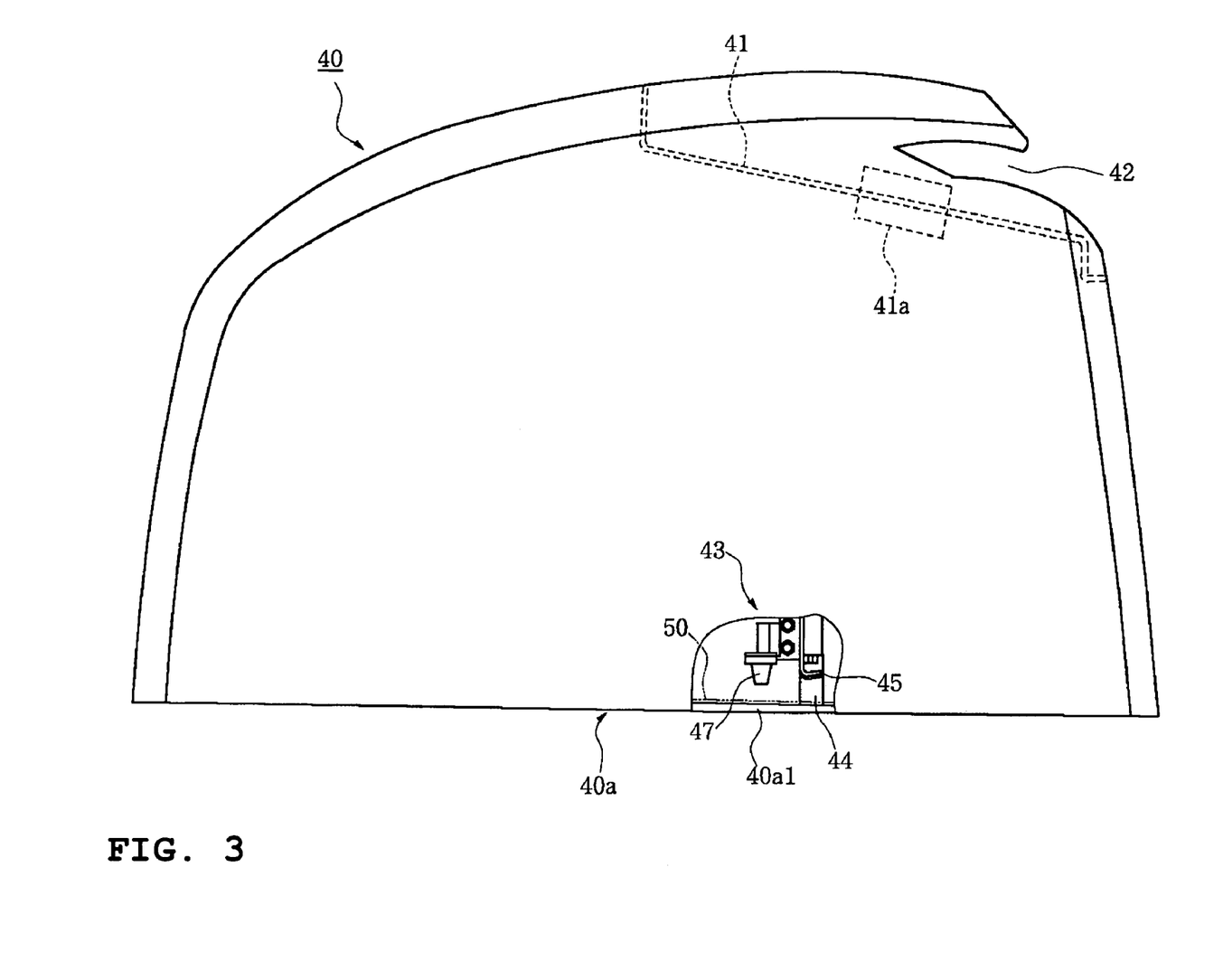
FIG. 3 is a side view of a top cowl, partially cut away to show an attachment part.
Figure 4:
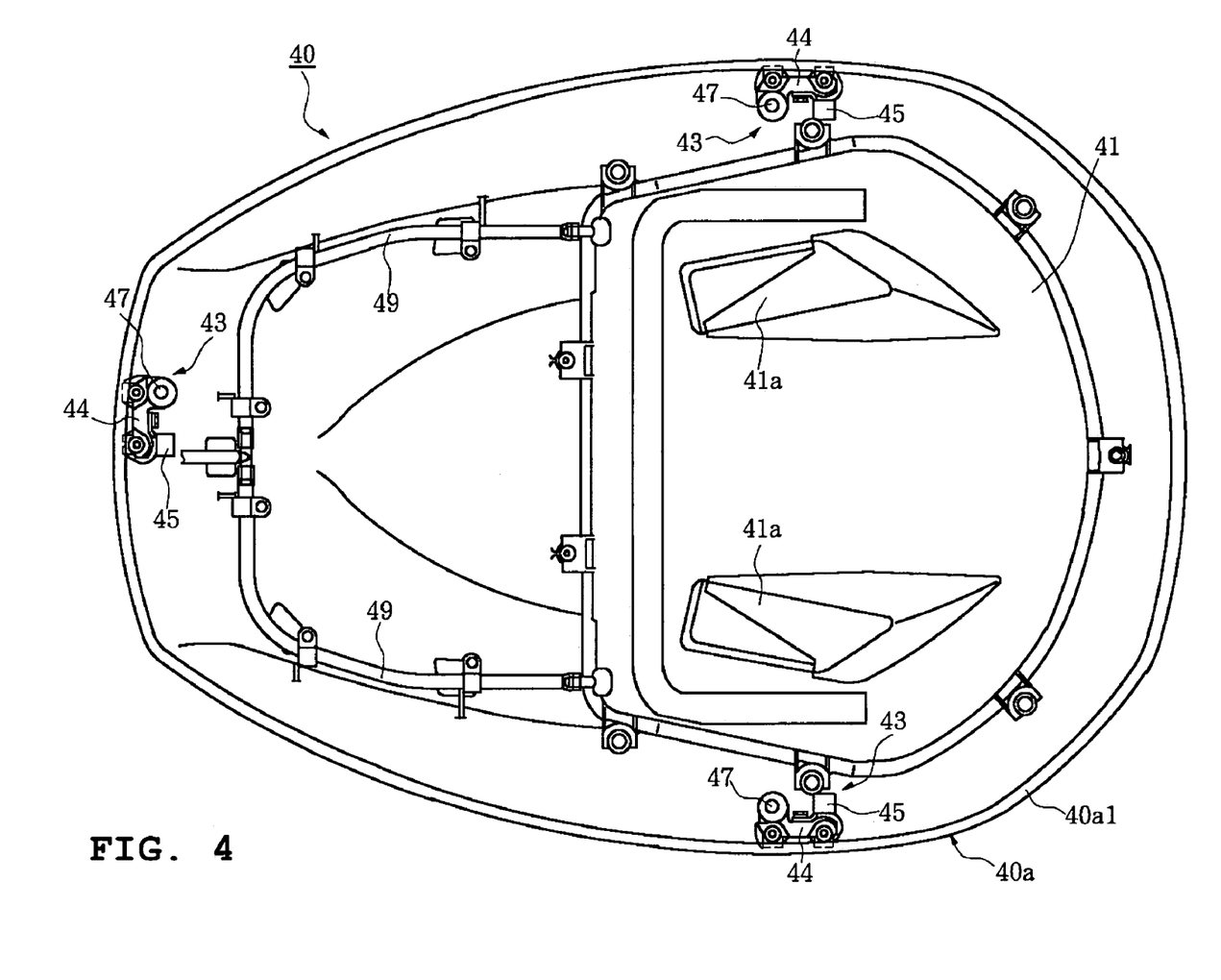
FIG. 4 is an inside view of the top cowl viewed from below the top cowl.
Figure 5:
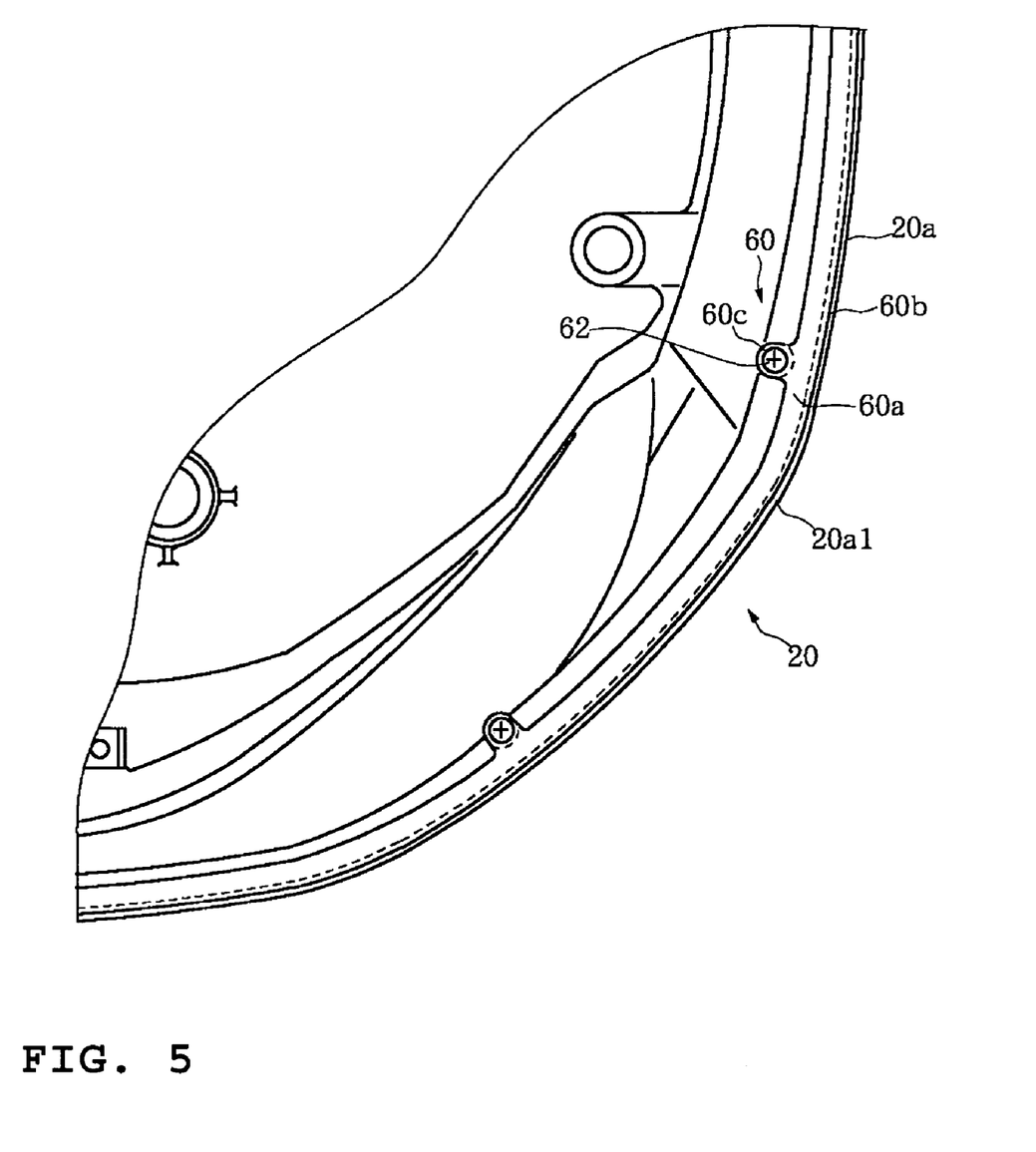
FIG. 5 is a top plan view of a portion of the bottom cowl.
Figure 6:
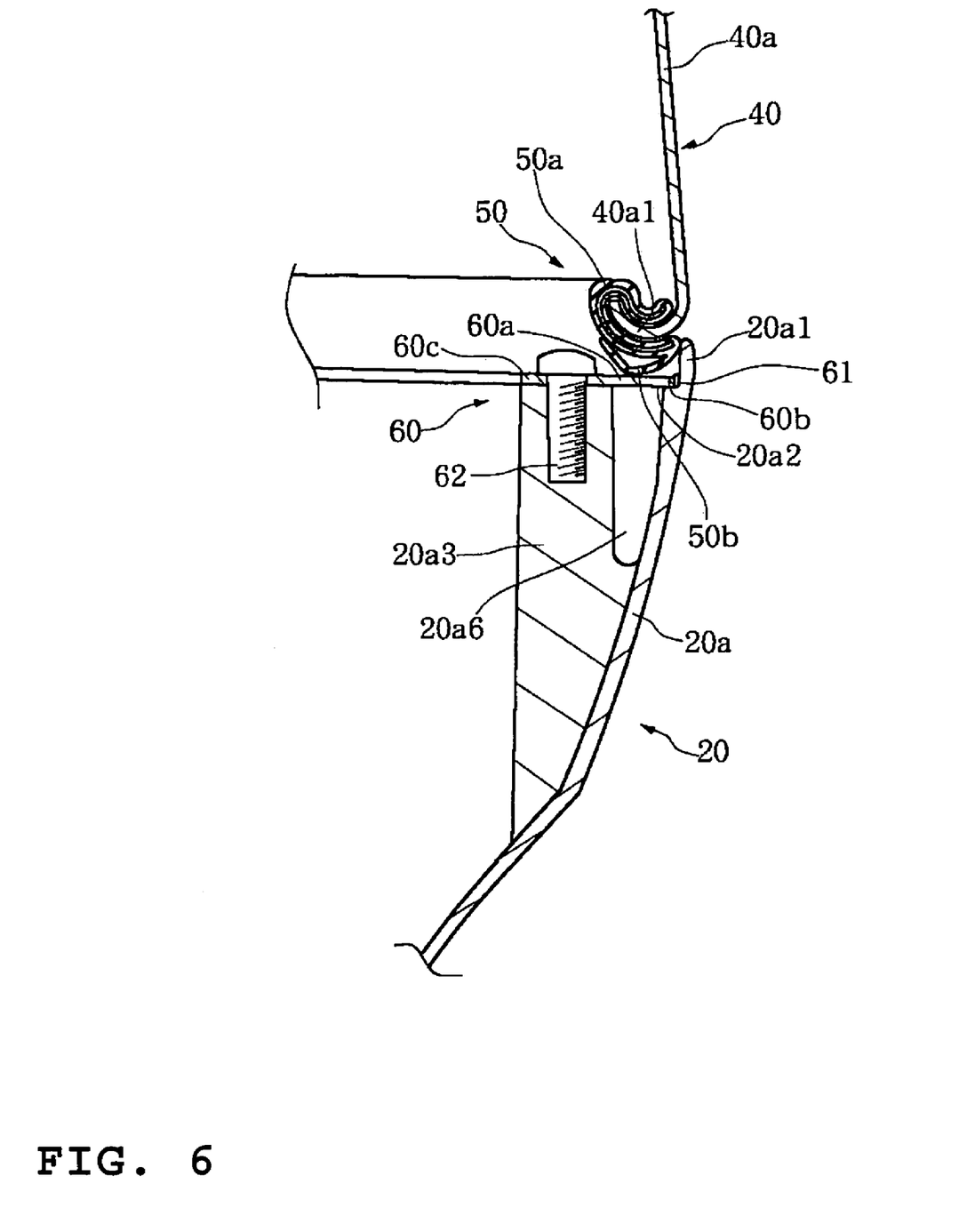
FIG. 6 is a cross-sectional view of an embodiment of a seal formed between the top cowl and the bottom cowl.

The cowling 7 has a bottom cowl 20 and a top cowl 40 adapted to be releasably coupled with each other in accordance with the embodiment illustrated in FIG. 2 to FIG. 6. FIG. 2 is a plan view of the bottom cowl. FIG. 3 is a partially cutaway side view of the top cowl, showing an attachment part. FIG. 4 is an inside view of the top cowl. FIG. 5 is a plan view of a portion of the bottom cowl. FIG. 6 is a cross-sectional view showing a seal formed between the top cowl and the bottom cowl.

With reference to FIG. 2, the bottom cowl 20 of this embodiment preferably is made of aluminum by way of a die casting method. With particular reference to FIGS. 2, 5 and 6, the bottom cowl 20 preferably has an opening edge 20a, from which a rib 20a1 extends upward. Attachment parts 21 of the bottom cowl are provided at three positions, that is, a position on the side of the hull and positions on both sides, along the entire opening edge 20a of the bottom cowl 20. Other embodiments may use more or less attachment parts 21 as desired.

With reference to FIGS. 3, 4 and 6, the top cowl 40 preferably is provided therein with a molding 41 for covering an intake opening 42 of the top cowl 40. The molding preferably 41 has a pair of right and left air intake openings 41a. Preferably, air introduced through the intake opening 42 and sucked through the air intake openings 41a flows across and thus cools the engine 10 and is eventually sucked into an air cleaner (not shown) and into the engine to be used in combustion. Water drops on the molding 41 are collected and discharged through a discharge hose 49 so as not to fall onto the engine 10.

The top cowl 40 preferably is formed by pressing a nonferrous metal plate, such as aluminum and magnesium plate. The top cowl 40 has an opening edge 40a, which preferably is curved inward to form a curved part 40a1. Specifically, the curved part 40a1 is formed by bending the opening edge 40a of the top cowl 40 into a curled shape. The curved part 40a1 preferably is in an arc shape. More specifically, the curved part 40a1 is curved in a U-shape with the open side facing up and formed continuously all along the opening edge 40a.

Top side attachment parts 43 are provided at three positions, that is, a position on the side of the hull and positions on both sides, along the opening edge 40a of the top cowl 40. A hook mounting member 44 has a bent part at the lower edge, which is engaged and supported with the inside of a curved part 40a1 formed on the opening edge 40a of the top cowl 40. Other embodiments may employ more or less attachment parts 43, which preferably are substantially aligned with attachment parts 21 of the bottom cowl 20.

To close the top cowl 40 to be attached to the bottom cowl 20, top side hooks 45 are pressed against bottom side hooks 23 to rotate the bottom side hooks 23. The bottom side hooks 23 are cleared off the top side hooks 45 by their own rotation. Then, the bottom side hooks 23 are rotated in the opposite direction to return to the original positions with the top side hooks 45 below the bottom side hooks 23, and the engaged state is established.

When the top cowl 40 and the bottom cowl 20 are coupled with each other, positioning dampers 47 of the top side attaching parts 43 are engaged with the attaching parts 21 of the bottom cowl to aid correct positioning.

When the top cowl 40 and the bottom cowl 20 are coupled with each other, a seal member 50 provides a seal between the top cowl 40 and the bottom cowl 20 as shown in FIG. 6. The seal member 50 preferably has an engaging part 50a and a seal part 50b. The seal member 50 is attached to the top cowl 40 by engaging the engaging part 50a with the curved part 40a1 formed along the opening edge 40a of the top cowl 40 except for the parts where there are the hook mounting members 44. The seal part 50b of the seal member 50 preferably extends along the opening edge 40a along substantially the entire circumference of the bottom cowl 20.

An annular sealing rail 60 forming a sealing face 60a is attached to the opening edge 20a of the bottom cowl 20. The annular sealing rail 60 preferably is made of iron or stainless steel, and thus preferably is substantially rigid. Further, the sealing rail 60 preferably extends along substantially the entire circumference of the bottom cowl 20. The sealing face 60a has a tight fitting part 60b and an attaching part 60c on the outer and inner sides of the sealing face, respectively. The attaching part 60c protrudes inward from a part of the inner side.

A sealing step 20a2 preferably is formed adjacent the opening edge 20a about the circumference of the bottom cowl 20. With specific reference to FIGS. 2 and 6, a plurality of attaching bosses 20a3 and a corresponding rib 20a6 are formed at spaced apart locations about the periphery of the bottom cowl 20. Attachment of the annular sealing rail 60 is achieved by tightly fitting the outer tight fitting part 60b to the sealing step 20a2 using an adhesive sealant 61, fastening the inner attaching part 60c to the corresponding attaching bosses 20a3 using screws 62, and being supported by the rib 20a6. The adhesive sealant 61 and the screw 62 preferably are used to attach the bottom cowl 20 and the annular sealing rail 60 to each other. It is to be understood, however, that fastening of the attaching part 60c to the attaching boss 20a3 is not limited to using the screw 62. In other embodiments, other joint members for adhesive fixing, such as rivet and resin anchor, may also be used.

In certain embodiments, low adhesive property may suffice for an attaching part between the opening edge 20a of the bottom cowl 20 and the annular sealing rail 60, because the attaching part may only be subjected to an external force or a counterforce produced by deformation of the rubber seal member 50. In such embodiments, any adhesive thus may be selected focusing on sealability in terms of adhesive performance. The joint member for adhesive fixing may only have a role of temporary mechanical fastening. This could result in weight reduction of a fastening member.

The cowling structure of this embodiment uses the annular sealing rail 60 to seal the sealing faces of the top cowl 40 and the bottom cowl 20. Addition of the annular sealing rail 60 enables the sealing step 20a2 forming the mating face to be thinner, thereby reducing the weight. In addition, a decrease in gross weight due to this weight reduction will result in substantial cost reduction. Further, absence of an extremely thick part from the sealing face is likely to provide improvement in product quality as well as reliable sealing.

The annular sealing rail 60 has the tight fitting part 60b and the attaching part 60c on the outer and inner sides of the sealing face 60a, respectively. Fixing the inner attaching part 60c allows the outer part of the annular sealing rail 60 to be tightly fitted, providing reliable sealing.

Figure 7:
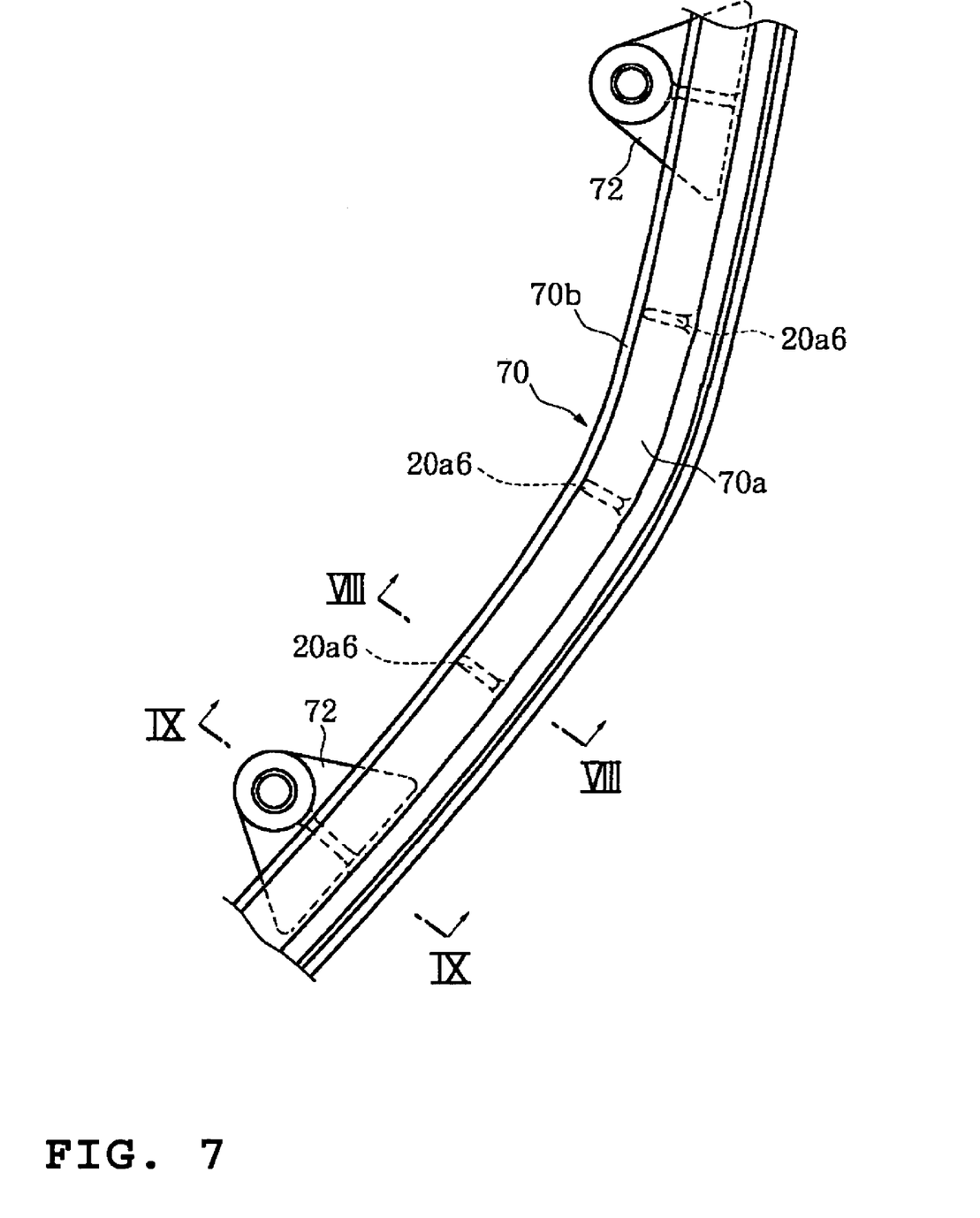
FIG. 7 is a plan view of a sealing rail structure of the bottom cowl.
Figure 8:
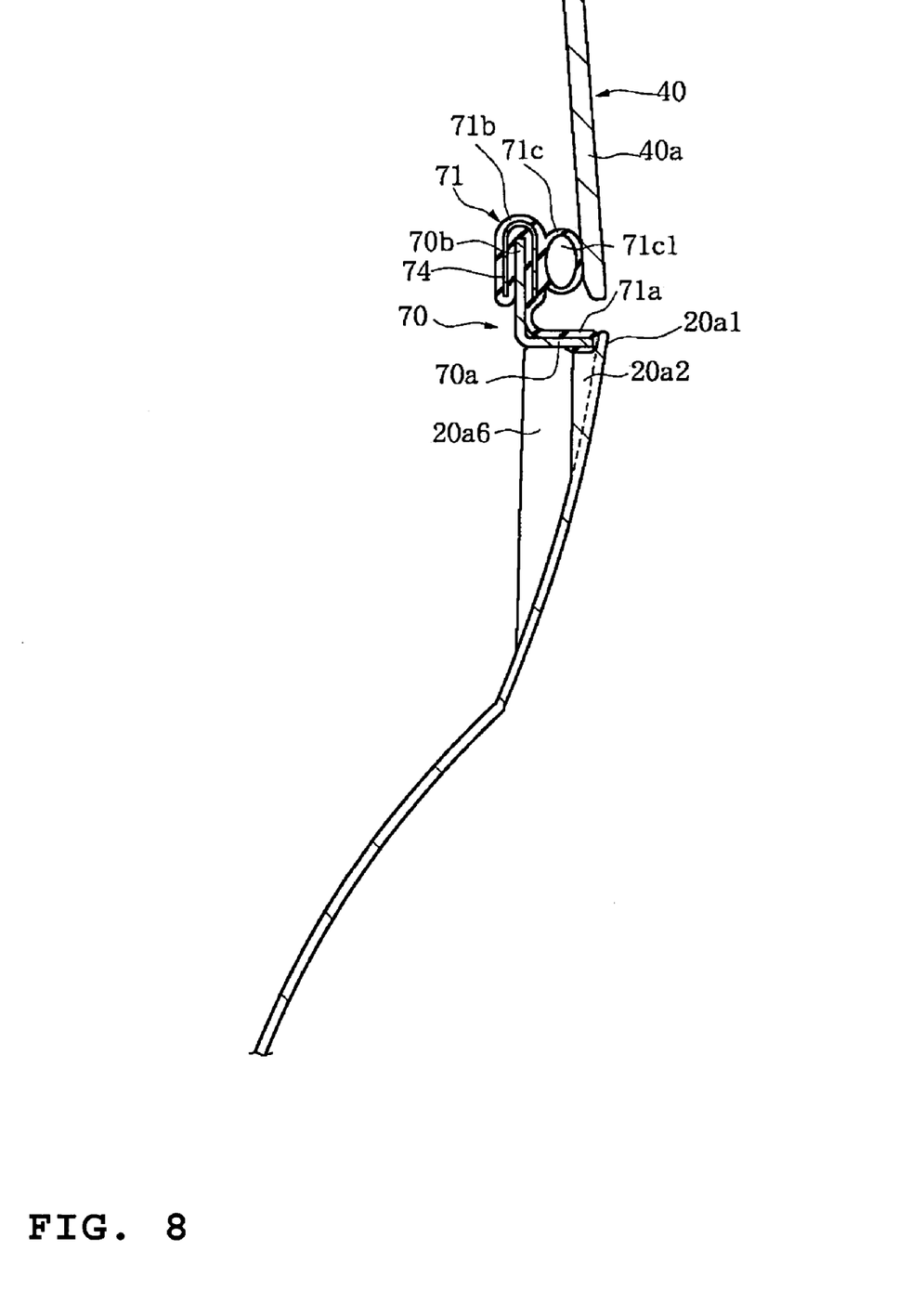
FIG. 8 is a cross-sectional view of a seal formed between the top cowl and the bottom cowl taken along the line VIII-VIII in FIG. 7.
Figure 9:
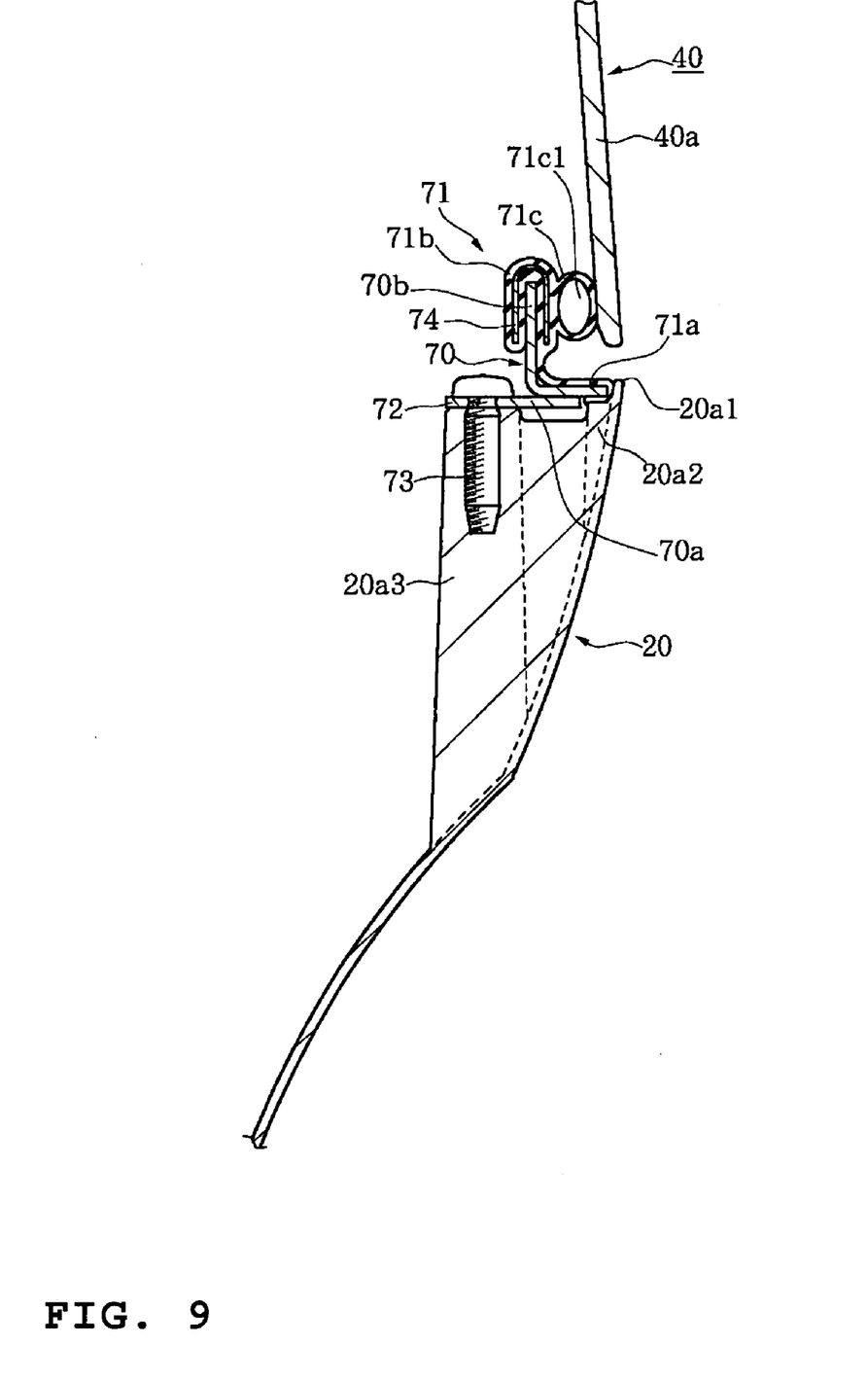
FIG. 9 is a cross-sectional view of a seal formed between the top cowl and the bottom cowl taken along the line IX-IX in FIG. 7.

FIGS. 7 to 9 illustrate another embodiment. FIG. 7 is a plan view of an attaching part of the bottom side. FIG. 8 is a cross-sectional view taken along the line VIII-VIII in FIG. 7. FIG. 9 is a cross-sectional view taken along the line IX-IX in FIG. 7.

In this embodiment, an annular sealing rail 70 forming a sealing face is attached to an opening edge 20a1 of a bottom cowl 20. The annular sealing rail 70 preferably is made of iron or stainless steel and is formed into an L-shape in cross-section, having a base part 70a and an upstanding part 70b. An annular sealing member 71 forming a sealing face preferably is mounted along the base part 70a and the upstanding part 70b.

The illustrated annular sealing member 71 includes a base seal 71a, an upstanding seal 71b and a sealing face 71c. An attachment plate 72 preferably is welded to the base part 70a, and is fastened to a corresponding attaching boss 20a3 with a screw 73. The base part 70a is supported by spaced apart ribs 20a6.

The upstanding seal 71b preferably is provided with a core plate 74, and is attached so as to cover the upstanding part 70b. The base seal 71a is attached so as to cover the base part 70a. The base seal 71a preferably comes into contact with a sealing step 20a2 to seal the base part 70a and the sealing step 20a2. The attachment plate 72 may be joined to the base part 70a not only by way of welding, but also by riveting.

The sealing face 71c preferably has a hollow portion 71c1, and preferably press-contacts an opening edge 40a of a top cowl 40 to provide sealing.

The illustrated annular sealing rail 70 is attached to the bottom cowl 20 in a manner described above. However, in another embodiment, the annular sealing rail 70 may also be attached to the top cowl 40 rather than the bottom cowl 20, and in the same manner. Addition of the annular sealing member 71 to the annular sealing rail 70 enables a part where the sealing face is formed to be thinner, thereby providing reliable sealing while achieving weight reduction of the product.

In other embodiments, rather than a portion of the sealing member 71 effecting a seal between the rail 70 and the edge 20a1 of the bottom cowl 20, an adhesive, welding, or the like may be employed to attach the rail 70 to the cowl. Additionally, other embodiments may use different shapes or types of seals, and even a different shape of annular sealing rail that is employed in the illustrated embodiments.

Figure 10:
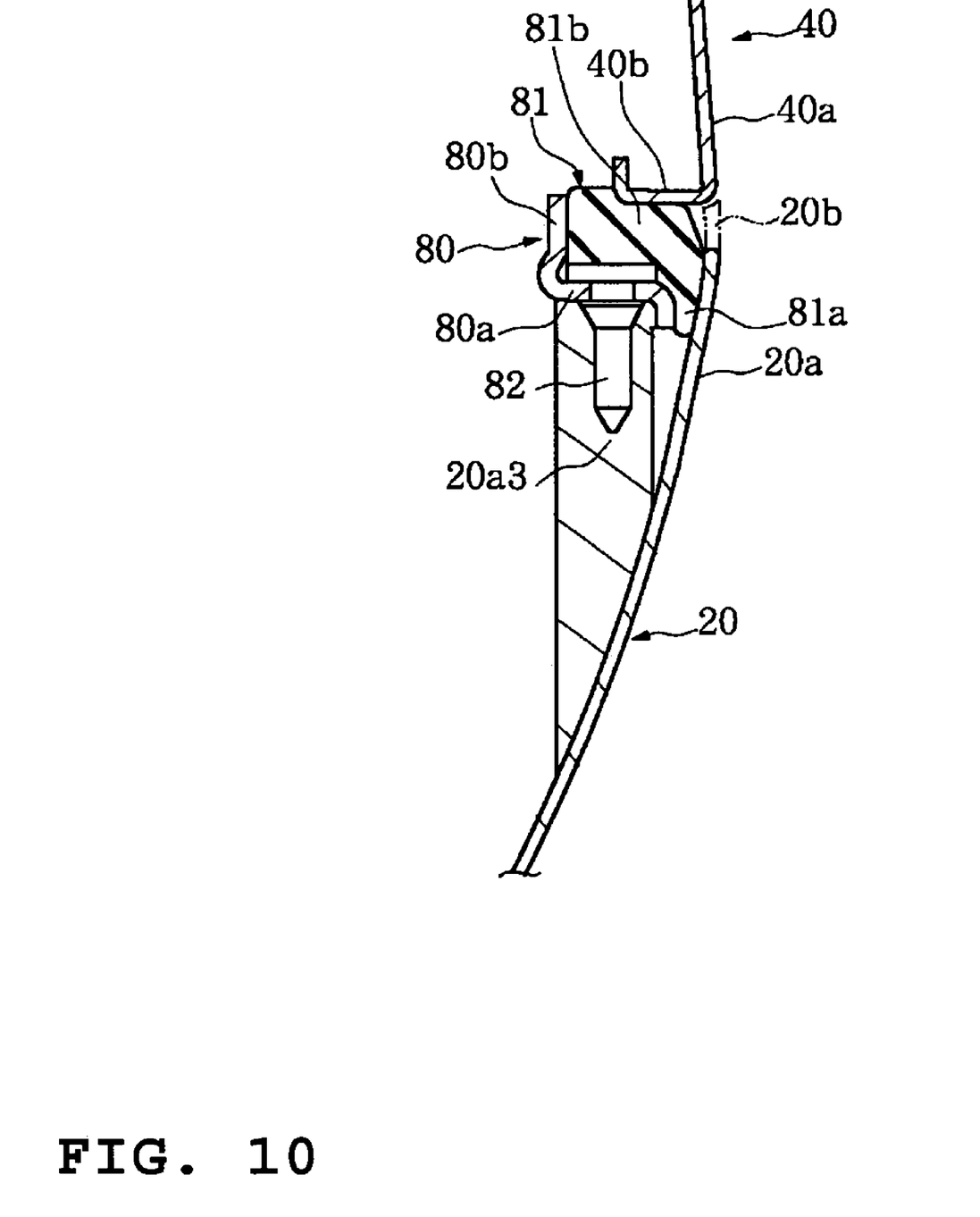
FIG. 10 is a cross-sectional view of another embodiment of a seal formed between the top cowl and the bottom cowl.

FIG. 10 is a cross-sectional view of a sealing part formed between a top cowl and a bottom cowl and illustrates still another embodiment.

In this embodiment, an annular sealing rail 80 is secured to a plurality of spaced apart attaching bosses 20a3 adjacent an opening edge 20a of a bottom cowl 20. The annular sealing rail 80 preferably is made of iron or stainless steel and formed into an L-shape in cross-section, while having a base part 80a and an upstanding part 80b. An annular sealing member 81 forming a sealing face preferably is fastened with a clip 82, fastener, adhesive, or other method to the base part 80a and the upstanding part 80b of the annular sealing rail 80 in an integral manner. A sealing face 81a of the annular sealing member 81 is inserted between the base part 80a of the annular sealing rail 80 and the opening edge 20a of the bottom cowl 20 to provide sealing.

The opening edge 40a of the top cowl 40 preferably is bent inward to form a flat face 40b. The flat face 40b of the top cowl 40 comes into contact with the sealing face 81a of the annular sealing member 81 to seal a mating face between the flat face 40b and a sealing part 81b.

This embodiment shows a sealing structure for cowls, that is, a top cowl 40 formed by a pressing process and a bottom cowl 20 formed thinner by the way of casting and provided with the annular sealing member 81. The annular sealing member 81 is fastened, using a clip 82, to the annular sealing rail 80 attached on the bottom cowl 20. The annular sealing member 81, which is preferably made by a drawing process, preferably adheres to the clip 82 in an integral manner.

In this embodiment, the annular sealing member 81 is adopted to secure a relatively wide sealing surface and range of vertical relative positions for the top cowl 40 and the bottom cowl 20 to be pressed against each other, thereby enhancing sealability. Also, the single, one-piece annular sealing member 81 allows sealing the mating face between the annular sealing member 81 and the top cowl 40, as well as the mating face between the annular sealing member 81 and the bottom cowl 20. This can save human power in assembly as only a single seal member is to be installed.

In one embodiment, a seal receiving face 20b extends upward from the opening edge 20a of the bottom cowl 20 so as to prevent the sealing part from being exposed to the external environment as shown in FIG. 10.

In this invention, an annular sealing rail forming a sealing face is attached to a bottom cowl. This enables a part forming the sealing face to be thinner, thereby providing reliable sealing and reducing the product weight.

As can be understood, the annular sealing rail as discussed herein can operate as a support for an annular seal. It is to be understood, however, that in other embodiments the annular seal support or rail is not necessarily unitarily formed, or even continuous in structure about the entire circumference of the corresponding cowl. For example, in one embodiment, the annular seal support comprises a plurality of gaps in order to save on overall weight, but still provide substantial support for the seal member. Preferably, the seal member comprises a substantially rigid internal support member so that a body of the sealing member maintains its shape even in portions that are not directly supported by the annular seal rail.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An outboard motor having a cowling enclosing an internal combustion engine, the cowling comprising a top cowl and a bottom cowl configured to be joined to one another so that a bottom portion of the top cowl is coupled to a top portion of the bottom cowl, the bottom cowl having an annular sealing rail adapted to form a sealing face, the sealing face adapted to engage a sealing member to effect a generally watertight seal between the top and bottom cowls, the sealing rail disposed generally transverse to the upper portion of the bottom cowl, wherein the sealing rail comprises a portion that tightly engages the inner surface of the bottom cowl, and an attachment portion adapted to affix the rail to the bottom cowl.

2. The outboard motor of claim 1, wherein the sealing rail is substantially rigid.

3. The outboard motor of claim 2, wherein the sealing rail is substantially continuous about the circumference of the bottom cowl.

4. The outboard motor of claim 3, wherein the sealing rail comprises a seal support surface that is oriented in a direction generally transverse to the upper edge of the bottom cowl.

5. The outboard motor of claim 2 further comprising an annular sealing member attached to the annular sealing rail, the annular sealing member forming a sealing face.

6. The outboard motor of claim 5, wherein the annular sealing member has a sealing face for sealing with the top cowl and another sealing face for sealing with the bottom cowl.

7. The outboard motor of claim 1, wherein the tightly engaging portion and the attachment portion are disposed on outer and inner sides, respectively, of the sealing face.

8. The outboard motor of claim 7, wherein the tightly engaging portion is adhered to the bottom cowl.

9. The outboard motor of claim 7, wherein a portion of a sealing member is disposed between the tightly engaging portion and the bottom cowl.

10. An outboard motor having a cowling enclosing an internal combustion engine, the cowling comprising a first cowl member and a second cowl member configured to be joined to one another so that an edge portion of the first cowl is coupled to an edge portion of the second cowl, the first cowl member having an annular seal support that is formed separately from the first cowl, a plurality of support bosses from the first cowl supporting the annular seal support, the annular seal support comprising a seal support surface adapted to support an annular sealing member, the annular sealing member extending about substantially the circumference of the first cowl and comprising a first sealing face to effect a seal with the first cowl member, and a second sealing face to effect a seal with the second cowl member.

11. The outboard motor of claim 10, wherein the first cowl member is a bottom cowl, and the second cowl member is a top cowl.

12. The outboard motor of claim 10, wherein the annular seal member is attached to the annular seal support by adhesive.

13. The outboard motor of claim 10, wherein the annular seal member is attached to the annular seal support by a clip.

14. The outboard motor of claim 10, wherein the first cowl member additionally comprises a plurality of spaced apart ribs that engage and support the annular seal support.

15. The outboard motor of claim 10, wherein the annular support member is generally continuous about substantially the entire circumference of the first cowl member.

* * * * *